(12) United States Patent
Chen et al.

(10) Patent No.: US 11,852,855 B2
(45) Date of Patent: Dec. 26, 2023

(54) ELECTRONIC DEVICE AND METHOD FOR MANUFACTURING ELECTRONIC DEVICE

(71) Applicant: Innolux Corporation, Miao-Li County (TW)

(72) Inventors: Yi-Hsin Chen, Miao-Li County (TW); Ying-Jen Chen, Miao-Li County (TW); Chin-Lung Ting, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/694,723

(22) Filed: Mar. 15, 2022

(65) Prior Publication Data

US 2022/0326423 A1    Oct. 13, 2022

Related U.S. Application Data

(60) Provisional application No. 63/172,717, filed on Apr. 9, 2021.

(30) Foreign Application Priority Data

Nov. 11, 2021    (CN) .......................... 202111333029.8

(51) Int. Cl.
G02B 5/30    (2006.01)

(52) U.S. Cl.
CPC .................................. G02B 5/3016 (2013.01)

(58) Field of Classification Search
CPC . G02F 1/133528; G02B 5/3041; G02B 5/305; G02B 5/3016

USPC ............ 349/96; 359/485.03, 485.04, 487.01, 359/487.02, 489.01
See application file for complete search history.

(56) References Cited

U.S. PATENT DOCUMENTS

| | | | | |
|---|---|---|---|---|
| 6,046,789 | A * | 4/2000 | Funfschilling | G02F 1/141 349/183 |
| 2009/0040611 | A1* | 2/2009 | Kitamura | B29D 11/0073 264/1.34 |
| 2012/0307363 | A1* | 12/2012 | Kozenkov | G02B 1/04 534/856 |
| 2015/0362799 | A1* | 12/2015 | Kim | G02B 5/3016 349/96 |
| 2019/0235301 | A1* | 8/2019 | Park | G02F 1/13725 |
| 2021/0373382 | A1* | 12/2021 | Sakai | G02B 5/045 |

FOREIGN PATENT DOCUMENTS

| | | |
|---|---|---|
| CN | 1282896 | 11/2006 |
| TW | 202026163 | 7/2020 |

OTHER PUBLICATIONS

"Office Action of Taiwan Counterpart Application", dated Sep. 28, 2022, p. 1-p. 4.

* cited by examiner

Primary Examiner — Edward J Glick
Assistant Examiner — David Y Chung
(74) Attorney, Agent, or Firm — JCIPRNET

(57) ABSTRACT

An electronic device is provided. The electronic device includes a panel and a polarizing element. The polarizing element is disposed at one side of the panel, and the polarizing element includes a plurality of coating polarizing layers. A method for manufacturing an electronic device is further provided.

7 Claims, 7 Drawing Sheets

ELECTRONIC DEVICE AND METHOD FOR MANUFACTURING ELECTRONIC DEVICE

CROSS-REFERENCE TO RELATED APPLICATION

This application claims the priority benefits of U.S. application Ser. No. 63/172,717, filed on Apr. 9, 2021 and China application serial no. 202111333029.8, filed on Nov. 11, 2021. The entirety of the above-mentioned patent applications is hereby incorporated by reference herein and made a part of this specification.

BACKGROUND

Technical Field

The disclosure relates to an electronic device and a method for manufacturing an electronic device.

Description of Related Art

In an electronic device, one or a plurality of optical film (e.g. a polarizing film) is usually adopted on a panel. Therefore, how to manufacture the optical film and how to combine the optical film and the panel are still under development.

SUMMARY

Embodiments of the disclosure provide an electronic device. The electronic device includes a panel and a polarizing element. The polarizing element is disposed at a side of the panel, and the polarizing element includes a plurality of coating polarizing layers.

Embodiments of the disclosure provide a method for manufacturing an electronic device. The method includes the following. A panel is provided. A polarizing element is disposed at a side of the panel. The polarizing element includes a plurality of polarizing layers. The plurality of polarizing layers are formed through a coating manufacturing process.

In order to make the aforementioned features and advantages of the disclosure comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
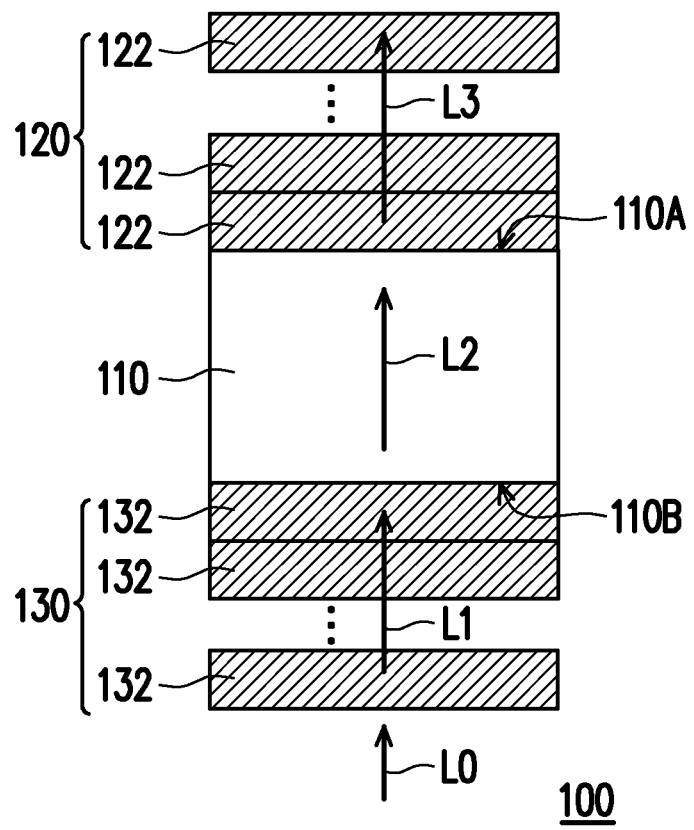
FIG. 1 is a schematic diagram of an electronic device according to an embodiment of the disclosure.

Certain words are used throughout the specification of the disclosure and the appended claims to refer to specific elements. Those skilled in the art should understand that electronic appliance manufacturers may refer to the same element by different names. This specification does not intend to distinguish elements with a same function but different names. In the following specification and claims, words such as "including", "containing", and "having" are open-ended words, so they should be interpreted as meaning "containing but not limited to . . . ".

Direction terms mentioned in this specification, such as "upper", "lower", "front", "rear", "left", "right", etc., are only directions with reference to the drawings. Therefore, the direction terms used is for illustration, not for limiting this disclosure. In the drawings, each drawing shows the general features of the method, structure, and/or material used in a specific embodiment. However, these drawings should not be construed as defining or limiting the scope or nature of the embodiments. For example, for the sake of clarity, the relative size, thickness, and position of each layer, region, and/or structure may be reduced or enlarged.

A structure (or layer type, component, substrate) being located on/above another structure (or layer type, element, substrate) described in this disclosure may refer to two structures being adjacent and directly connected to each other, or may refer to two structures being adjacent but not directly connected to each other. An indirect connection means that there is at least one intermediary structure (or intermediary layer, intermediary component, intermediary substrate, or intermediary interval) between two structures, and the lower lateral surface of a structure is adjacent or directly connected to the upper lateral surface of an intermediary structure, and the upper lateral surface of another structure is adjacent or directly connected to the lower lateral surface of the intermediary structure. The intermediary structure may be a monolayer or multi-layer physical structure or a non-physical structure, and the disclosure is not limited thereto. In this disclosure, when a structure is "above" another structure, it may mean that a certain structure is "directly" on another structure, or that a certain structure is "indirectly" on another structure, that is, there is at least one structure between said certain structure and said another structure.

The terms "approximately", "equal to", "equal" or "same", "substantially" or "roughly" are generally interpreted as being within 20% of a given value or range, or interpreted as being within 10%, 5%, 3%, 2%, 1%, or 0.5% of a given value or range. The ordinal numbers used in the specification and claims, such as "first", "second", etc., are used to modify an element. They do not themselves imply and represent that the element(s) have any previous ordinal number, and also do not represent the order of one element and another element, or the order of manufacturing methods. The use of these ordinal numbers is to clearly distinguish an element with a certain name from another element with the same name. The claims and the specification may not use the same terms, and accordingly, the first component in the specification may be the second component in the claims.

The terms "electrically connect" and "couple" described in the disclosure include any direct and indirect electrical connection. In a case of direct electrical connection, end points of two circuits are directly connected or connected to each other with a conductive line. In a case of indirect electrical connection, there is a switch, a diode, a capacitor, inductance, a resistor, or other suitable component, or a combination of the components above between the end points of the two circuits; however, the disclosure is not limited thereto.

In the disclosure, the thickness, the length, and the width may be measured by an optical microscope, and the thickness and the width may be measured based on a cross-sectional image in an electron microscope, but the disclosure is not limited thereto. In addition, there may be a certain error between any two values or directions used for comparison. In addition, the terms "approximately", "equal to", "equal" or "same", "substantially" or "roughly" are generally interpreted as being within 10% of a given value or range. Moreover, the terms "a range from a first value to a second value" and "a range between a first value and a second value" indicate that the range includes the first value, the second value, and other values in between. When a first direction is perpendicular to a second direction, an angle between the first direction and the second direction ranges from 80 degrees to 100 degrees. When the first direction is parallel to the second direction, the angle between the first direction and the second direction ranges from 0 degrees to 10 degrees.

It should be noted that the embodiments listed below can replace, recombine, and mix features in several different embodiments to achieve other embodiments without departing from the principle of the disclosure. The features of the embodiments may be arbitrarily mixed and combined as long as they do not depart from or conflict with the spirit of the disclosure.

Unless otherwise defined, all terms (including technical and scientific terms) used herein have the same meaning as commonly understood by those of ordinary skill in the art to which the disclosure belongs. It will be further understood that terms such as those defined in commonly used dictionaries shall be construed to have a meaning consistent with their meaning in the context of the relevant art and the disclosure and will not be construed to have an idealized or overly formal meaning unless expressly defined as such herein. In the disclosure, an electronic device may include a display device, a backlight device, an antenna device, a sensing device, or a splicing device, but is not limited thereto. The electronic device may be a bendable or flexible electronic device. The display device may be a non-self-luminous type display device or a self-luminous type display device. The antenna device may be a liquid crystal type antenna device or a non-liquid crystal type antenna device. The sensing device may be a sensing device that senses capacitance, light, heat, or ultrasound, but is not limited thereto. In the disclosure, an electronic element may include a passive element and an active element, such as a capacitor, a resistor, an inductor, a diode, and a transistor. The diode may include a light emitting diode or a photodiode. The light emitting diode may include, for example, an organic light emitting diode (OLED), a mini light emitting diode (mini LED), a micro light emitting diode (micro LED), or a quantum dot light emitting diode (quantum dot LED), but is not limited thereto. Hereinafter, the display device as the electronic device or the splicing device will be used to illustrate the content of the disclosure, but the disclosure is not limited thereto.

It should be noted that the technical solutions provided in different embodiments below may be replaced, recombined, or mixed for implementation to constitute another embodiment without violating the spirit of the disclosure.

In some embodiments of the disclosure, terms such as "connect" and "interconnect" with respect to bonding and connection, unless specifically defined, may refer to two structures that are in direct contact with each other, or may refer to two structures that are indirectly in contact with each other, wherein there are other structures set between these two structures. In addition, the terms that describe joining and connecting may apply to the case where both structures are movable or both structures are fixed. In addition, the terms "electrically connect" and "coupling" involves any direct and indirect electrical connection means.

In the following embodiments, the same or similar elements are denoted with the same or similar reference numerals, and the same description will not be repeated. In addition, features of different embodiments may be arbitrarily mixed or combined as long as the mixture or combination does not violate the spirit of the disclosure or cause any contradiction. All simple equivalent changes and modifications made in accordance with the present specification or claims still fall within the scope of the disclosure. Moreover, the terms such as "first" and "second" in the specification and claims are used to name different elements or distinguish between different embodiments and ranges, instead of setting an upper or lower limit on the number of components or limiting a manufacturing order or disposition order of the elements.

FIG. 1 is a schematic diagram of an electronic device according to an embodiment of the disclosure. An electronic device 100 of FIG. 1 includes a panel 110 and the polarizing elements (e.g. a polarizing element 120 and a polarizing element 130) disposed at a side of the panel 110. Specifically, the polarizing element 120 is disposed at a first side 110A of the panel 110, and the polarizing element 130 is disposed at a second side 110B of the panel 110. The first side 110A and the second side 110B are opposite to each other. In some embodiments, the panel 110 may be a display panel, such as a liquid crystal display panel, an organic light-emitting display panel, an electro-wetting display panel, an electrophoretic display panel, or other suitable panel. In some embodiments, the polarizing element 120 and/or the polarizing element 130 are disposed on an outer surface of the panel 110; however, the disclosure is not limited thereto. In some embodiments, the polarizing elements (e.g. the polarizing element 120 and the polarizing element 130) include a plurality of coating polarizing layers. For example, the polarizing element 120 may include a plurality of coating polarizing layers 122, and the polarizing element 130 may include a plurality of coating polarizing layers 132. In some embodiments, the coating polarizing layers 122 of the polarizing element 120 may be formed though a coating process. In some embodiments, the coating polarizing layers 132 of the polarizing element 130 may be formed though the coating manufacturing process. In some embodiments, the plurality of coating polarizing layers 122 may contact each other or not contact each other. In some embodiments, the plurality of coating polarizing layers 132 may contact each other or not contact each other. In some embodiments, the optical absorption axes of two adjacent ones of the plurality of coating polarizing layers 122 may be approximately parallel to each other. In some embodiments, the optical absorption axes of two adjacent ones of the plurality of coating polarizing layers 132 may be parallel to each other.

In some embodiments, one layer of the plurality of coating polarizing layers 122/132 contacts the panel 110. For example, the polarizing element 120 may directly contact the first side 110A of the panel 110 and include the plurality of coating polarizing layers 122, and the polarizing element 130 may contact the second side 110B of the panel 110 and include the plurality of coating polarizing layers 132. In some embodiments, one of the polarizing element 120 and the polarizing element 130 may be omitted. In some embodiments, one of the polarizing element 120 and the polarizing element 130 may be replaced with a stretch type polarizer film.

Taking the process of manufacturing the polarizing element 120 as an example, a method for manufacturing the electronic device 100 includes providing the panel 110 and disposing the polarizing element 120 at a side (such as the first side 110A) of the panel 110. A method for manufacturing the polarizing element 120 includes the following. A coating polarizing layer may include a liquid crystal material, a liquid crystal material mixed dye, or other replaceable material, is coated on the panel 110. The polarizing layer material may be cured into a layer to form a first layer of the coating polarizing layers 122; however, the disclosure is not limited thereto. Next, the steps of coating and curing are performed repeatedly on the formed coating polarizing layer 122 to sequentially form a second layer and other layers of the coating polarizing layers 122. Compared to the second layer and other layers of the coating polarizing layers 122, the first layer of the coating polarizing layers 122 may be closer to the panel 110, and the first layer of the coating polarizing layers 122 may contact the panel 110. That is, there is no other film layer between the first layer of the coating polarizing layers 122 and the panel 110; however, the disclosure is not limited thereto.

When the polarizing layer material is coated on the panel 110, the molecules of the material in the polarizing layer may be aligned, for example, approximately corresponding to a coating direction (e.g. a progressing direction of coating heads). After the polarizing layer material is cured, the orientation of the molecules of the material in the polarizing layer may be determined; however, the disclosure is not limited thereto. In some embodiments, when the polarizing layer material is a liquid crystal material, orientation of the liquid crystal material may be determined and an optical direction is provided. As a result, the coating polarizing layer 122 manufactured through the manufacturing method exhibits a polarizing property. An absorption axis of the coating polarizing layer 122 may be determined roughly according to the coating direction. In some embodiments, in the coating polarizing layer 122 formed through coating, the liquid crystal material that is closer to the panel 110 may be more well-arranged. As a result, when the plurality of coating polarizing layers 122 of the polarizing element 120 are manufactured with the same material, an interface may still be observed between the two adjacent ones of the coating polarizing layers 122. For example, when observing the two adjacent ones of the coating polarizing layers 122 contacting each other along a direction of a thickness of the panel 110, the non-continuous interfaces of the polarizing layer material that are well-arranged and not well-arranged may be observed, which may be applied to determining the interface of two adjacent ones of the coating polarizing layers 122. however, the disclosure is not limited to the method.

When manufacturing each layer of the coating polarizing layers 122, a fixed coating direction may be adopted, which means that a relative relation between the coating direction and orientation of the panel 110 is fixed. In this way, the plurality of coating polarizing layers 122 forming the polarizing element 120 may have the absorption axes with the same direction to provide a consistent polarization direction; however, the disclosure is not limited thereto. In some embodiments, a method for manufacturing the polarizing element 130 is roughly the same as the method for manufacturing the polarizing element 120, so the same description is not repeated. In some embodiments, when manufacturing the plurality of coating polarizing layers 132 of the polarizing element 130, a coating direction that is different from the coating direction adopted when manufacturing the coating polarizing layers 122 may be adopted. In some embodiments, a polarization direction provided by the polarizing element 130 may be different from a polarization direction provided by the polarizing element 120. In some embodiments, the polarization direction provided by the polarizing element 130 may be approximately perpendicular to the polarization direction provided by the polarizing element 120; however, the disclosure is not limited thereto. In other words, an absorption axis direction of the polarizing element 130 may be different from an absorption axis direction of the polarizing element 120. In some embodiments, the absorption axis of the polarizing element 130 may be roughly perpendicular to the absorption axis of the polarizing element 120. In some embodiments, the polarizing element 120 and/or the polarizing element 130 are manufactured on the panel 110 through coating, which may reduce a manufacturing cost.

In some embodiments, the panel 110 is a non-self-luminous type display panel, and the electronic device 100 may include a light source module (not shown). The light source module may be located at one side of the panel 110. Before a beam emitted by the light source module enters the panel 110, it passes one of the polarizing element 120 and the polarizing element 130. After the beam emitted by the light source module passes the panel 110, the light passes the other of the polarizing element 120 and the polarizing element 130 before the light is provided to a user (a viewer). Here, for example, the beam emitted by the light source module sequentially passes the polarizing element 130, the panel 110, and the polarizing element 120. A beam L0 may be converted into a first polarized light L1 by passing the polarizing element 130. The first polarized light L1 may have a linear polarization of a first direction. The first direction is the polarization direction provided by the polarizing element 130. The first polarized light L1 may be converted into a second polarized light L2 by passing the panel 110. The second polarized light L2 may have a linear polarization of a second direction. Next, the second polarized light L2 may be converted into a third polarized light L3 by passing the polarizing element 120. The third polarized light L3 may have a linear polarization of a third direction. The third direction is the polarization direction provided by the polarizing element 120. In some embodiments, the polarization direction of the first polarized light L1 may be perpendicular to the polarization direction of the third polarized light L3. In some embodiments, according to design requirements, the panel 110 may change the polarization direction of the first polarized light L1 or not change the polarization direction of the first polarized light L1. In some cases, if the panel 110 does not change the polarization direction of the first polarized light L1, which means that the polarization direction of the first polarized light L1 and the polarization direction of the second polarized light L2 are the same, most of the second polarized light L2 may be absorbed by the polarizing element 120 and be unable to pass through the polarizing element 120 after the second polarized light L2 enters the polarizing element 120. As a result, a dark state image (e.g. a black image) may be displayed. In some cases, if the panel 110 may change the polarization direction of the first polarized light L1 to cause the first polarized light L1 to be converted into the second polarized light L2 with the different polarization direction, at least a portion of the second polarized light L2 may pass the polarizing element 120 after the second polarized light L2 enters the polarizing element 120, so that a corresponding bright state image is displayed.

In the embodiment, the polarizing element 120 may include at least two coating polarizing layers 122. Polarization efficiency of the polarizing element 120 may be enhanced by passing the at least two coating polarizing layers 122. For example, when one coating polarizing layer 122 is adopted, the polarization efficiency of 99.5 may be provided. When the two coating polarizing layers 122 are adopted, the polarization efficiency of 99.8 may be provided; however, the disclosure is not limited thereto. Therefore, in response to different design requirements, a number of the coating polarizing layers 122 of the polarizing element 120 may be adjusted, the disclosure is not limited to the number of the coating polarizing layers 122 of the drawings. In addition, a thickness of one coating polarizing layer 122 ranges from 0.6 μm to 1 μm in some embodiments; however, the disclosure is not limited thereto.

Figure 2:
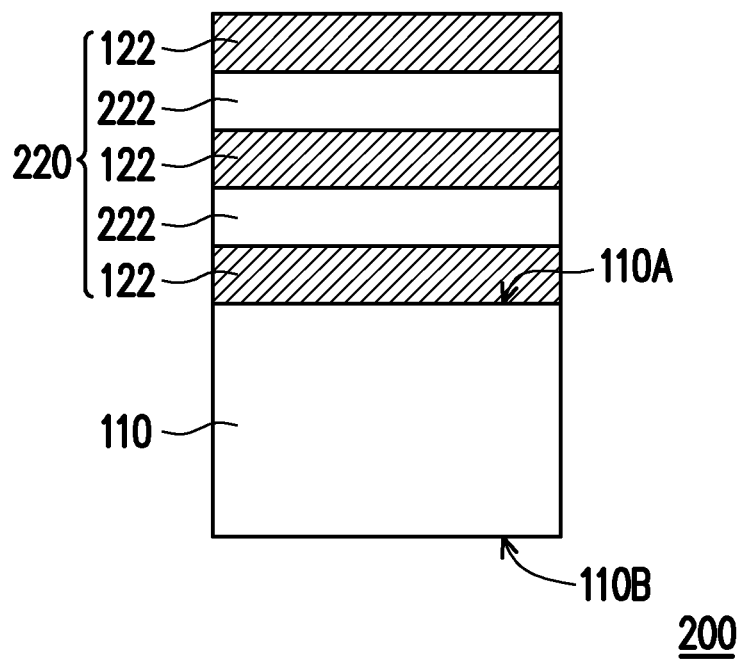
FIG. 2 is a schematic diagram of an electronic device according to an embodiment of the disclosure.

FIG. 2 is a schematic diagram of an electronic device according to an embodiment of the disclosure. An electronic device 200 of FIG. 2 includes the panel 110 and a polarizing element 220. The polarizing element 220 includes the plurality of coating polarizing layers 122 and at least one isolation layer 222. For example, the polarizing element 220 includes the plurality of coating polarizing layers 122 and plurality of isolation layers 222. Here, the panel 110 and the plurality of coating polarizing layers 122 are similar to the corresponding elements in the embodiments above. The description of the embodiments above may be referred to for the manufacturing method and the arrangement relation of the panel 110 and the plurality of coating polarizing layers 122, and they are not repeated. In the embodiment, the polarizing element 220 is disposed at the first side 110A of the panel 110. In other embodiments, a polarizer or the polarizing element 130 of FIG. 1 may be further disposed at the second side 110B of the panel 110 to achieve a required optical effect. Specifically, the difference between the polarizing element 220 and the polarizing element 120 is that the polarizing element 220 further includes the at least one isolation layer 222. The isolation layer 222 may be disposed between two coating polarizing layers 122 of the coating polarizing layers 122, and the isolation layer 222 does not exhibit the polarizing property. In other words, the isolation layer 222 may separate two adjacent ones of the coating polarizing layers 122. In the embodiment, one of the plurality of coating polarizing layers contacts the panel 110. For example, the coating polarizing layer 122 that is the closest to the panel 110 may contact the panel 110; however, the disclosure is not limited thereto. In other embodiments, other layer type may be inserted between the coating polarizing layer 122 that is the closest to the panel 110 and the panel 110.

The process of manufacturing the polarizing element 220 may include coating and curing the polarizing layer material of the embodiments above. In addition, after each of the coating polarizing layer 122 is formed, the isolation layer 222 is formed before manufacturing the next coating polarizing layer 122; however, the disclosure is not limited thereto. A method for forming the isolation layers 222 may include coating, deposition, or similar film-forming method; however, the disclosure is not limited thereto. In some embodiments, the isolation layers 222 may exhibit optical isotropy, but the isolation layers 222 do not exhibit the polarizing property. In this way, the coating polarizing layers 122 at two sides of each of the isolation layers 222 may approximately have the same polarization direction. In some embodiments, the isolation layers 222 may have phase retardation, and the coating polarizing layers 122 at the two sides of the isolation layers 222 may have the same or different polarization direction according to the phase retardation of the isolation layers 222. In some embodiments, the isolation layers 222 may have stickiness so that the coating polarizing layers 122 at the two sides of each of the isolation layers 222 may be able to be firmly attached to the isolation layers 222; however, the disclosure is not limited thereto. In some embodiments, a material of the isolation layers 222 may include an inorganic material, an organic material, or a combination thereof. For example, the material of the isolation layers 222 may include silicon nitride, a photoresist, a resin material, a polymer material, an optical adhesive, or other similar light-penetrative or transparent materials.

Figure 3:
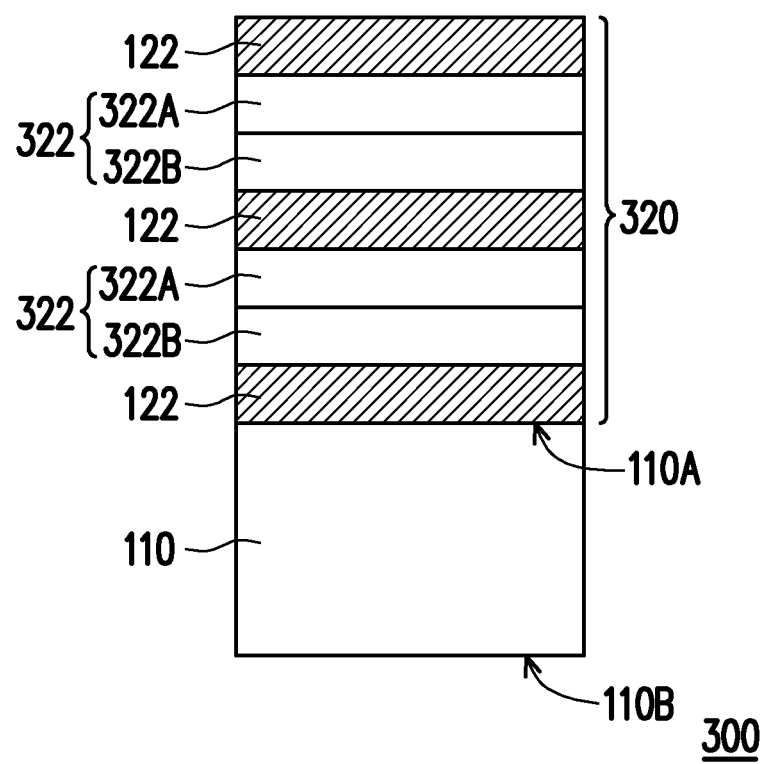
FIG. 3 is a schematic diagram of an electronic device according to an embodiment of the disclosure.

FIG. 3 is a schematic diagram of an electronic device according to an embodiment of the disclosure. An electronic device 300 of FIG. 3 includes the panel 110 and a polarizing element 320. The polarizing element 320 includes the plurality of coating polarizing layers 122 and plurality of isolation layers 322. Here, the panel 110 and the plurality of coating polarizing layers 122 are similar to the corresponding elements in the embodiments above. The description of the embodiments above may be referred to for the manufacturing method and the arrangement relation of the panel 110 and the plurality of coating polarizing layers 122, and they are not repeated. In the embodiment, the polarizing element 320 is disposed at the first side 110A of the panel 110. In other embodiments, the polarizer or the polarizing element 130 of FIG. 1 may be further disposed at the second side 110B of the panel 110 to achieve the required optical effect.

In the embodiment, the difference between the polarizing element 320 and the polarizing element 120 is that the polarizing element 320 further includes the isolation layers 322. The isolation layers 322 are disposed between the plurality of coating polarizing layers 122, and the isolation layers 322 do not exhibit the polarizing property. Specifically, the isolation layers 322 may include plurality of isolation sub-layers 322A and 322B. In the embodiment, the isolation sub-layer 322A may include a protection layer, and the isolation sub-layer 322B may include an adhesive layer. The isolation sub-layer 322B is configured to attach the isolation sub-layer 322A to one of the coating polarizing layers 122; however, the disclosure is not limited thereto. As a result, each of the isolation sub-layers 322B may be located between the isolation sub-layer 322A and one of the coating polarizing layers 122; however, the disclosure is not limited thereto. In other embodiments (not shown), the isolation layers 322 may include the plurality of isolation sub-layers 322A and 322B, and the two isolation sub-layers 322B may be located at two sides of the isolation sub-layers 322A.

In some embodiments, a method for manufacturing the electronic device 300 includes the following. First, the first (the closest to the panel 110) coating polarizing layer 122 may be formed on the panel 110 through coating described in the embodiment of FIG. 1. The isolation sub-layer 322A (the protection layer) may be attached to the panel 110 through the isolation sub-layer 322B (the adhesive layer). Next, the second coating polarizing layer 122 may formed on the isolation sub-layer 322A through coating described in the embodiment of FIG. 1. Another isolation sub-layer 322A may be attached to the panel 110 through the isolation sub-layer 322B. By repeating the steps above, the polarizing element 320 may be manufactured; however, the disclosure is not limited thereto. In some embodiments, the isolation sub-layer 322A may be a film layer manufactured in advance. For example, the isolation sub-layer 322A may include a formed film, glass, or the like. Therefore, by using the isolation sub-layer 322B, the isolation sub-layer 322A may be attached to the coating polarizing layer 122 instead of being directly manufactured on the panel 110. In some embodiments, the isolation sub-layer 322B may include a transparent optical adhesive having stickiness; however, the disclosure is not limited thereto. In some embodiments, the polarizing element 320 may be applied to the electronic device 100 of FIG. 1 to replace the polarizing element 120 or the polarizing element 130.

Figure 4:
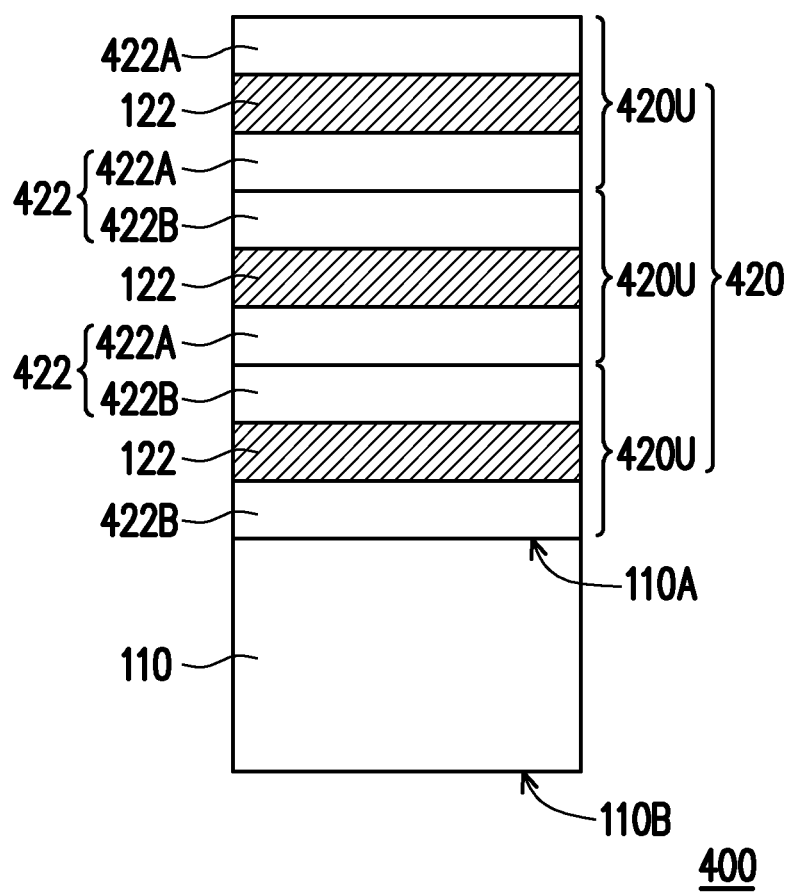
FIG. 4 is a schematic diagram of an electronic device according to an embodiment of the disclosure.

FIG. 4 is a schematic diagram of an electronic device according to an embodiment of the disclosure. An electronic device 400 of FIG. 4 includes the panel 110 and a polarizing element 420. The polarizing element 420 may include the plurality of coating polarizing layers 122 and/or plurality of isolation layers 422. Here, the panel 110 and the plurality of coating polarizing layers 122 are similar to the corresponding elements in the embodiments above. The description of the embodiments above may be referred to for the manufacturing method and the arrangement relation of the panel 110 and the plurality of coating polarizing layers 122, and they are not repeated.

In the embodiment, the polarizing element 420 may be stacked by multiple polarizing units 420U. Each of the polarizing units 420U may include the coating polarizing layer 122, an isolation sub-layer 422A and/or an isolation sub-layer 422B. The isolation sub-layer 422A may be a formed film, glass, or the like. The coating polarizing layer 122 may be formed on the isolation sub-layer 422A through the coating or deposition described in FIG. 1. The isolation sub-layer 422B may be an adhesive layer having stickiness, such as an optical adhesive, and the isolation sub-layer 422B may be formed on the coating polarizing layer 122. The polarizing unit 420U may be attached to the panel 110 or other polarizing unit 420U through the isolation sub-layer 422B to constitute the polarizing element 420; however, the disclosure is not limited thereto. That is, the coating polarizing layer 122 may be manufactured in advance and be attached to the panel 110 through an attachment method. In other words, the coating polarizing layer 122 in the polarizing element 420 does not contact the panel 110.

In the polarizing element 420, the isolation sub-layer 422A and the isolation sub-layer 422B may be disposed between two adjacent ones of the coating polarizing layers 122 to constitute the isolation layer 422; however, the disclosure is not limited thereto. However, the isolation sub-layer 422A and the isolation sub-layer 422B contacting each other to constitute the isolation layer 422 may belong to the different polarizing units 420U. For example, when the polarizing unit 420U that is closest to the panel 110 may be defined as the first layer polarizing unit 420U and the polarizing unit 420U on the first layer polarizing unit 420U is defined as the second layer polarizing unit 420U, the isolation sub-layer 422B of the first layer polarizing unit 420U may contact the panel 110, and the isolation sub-layer 422A of the first layer polarizing unit 420U and the isolation sub-layer 422B of the second layer polarizing unit 420U may constitute the isolation layer 420 between the two adjacent ones of the coating polarizing layers 122. In the embodiment, the isolation layer 420 may not exhibit the polarizing property. Specifically, the isolation sub-layer 422A and the isolation sub-layer 422B do not exhibit the polarizing property. Therefore, when a beam passes the isolation sub-layer 422A and the isolation sub-layer 422B, the isolation sub-layer 422A and the isolation sub-layer 422B do not apparently change a polarization state. In this way, the polarization of the polarizing element 420 is mainly determined by the plurality of coating polarizing layers 122.

Figure 5:
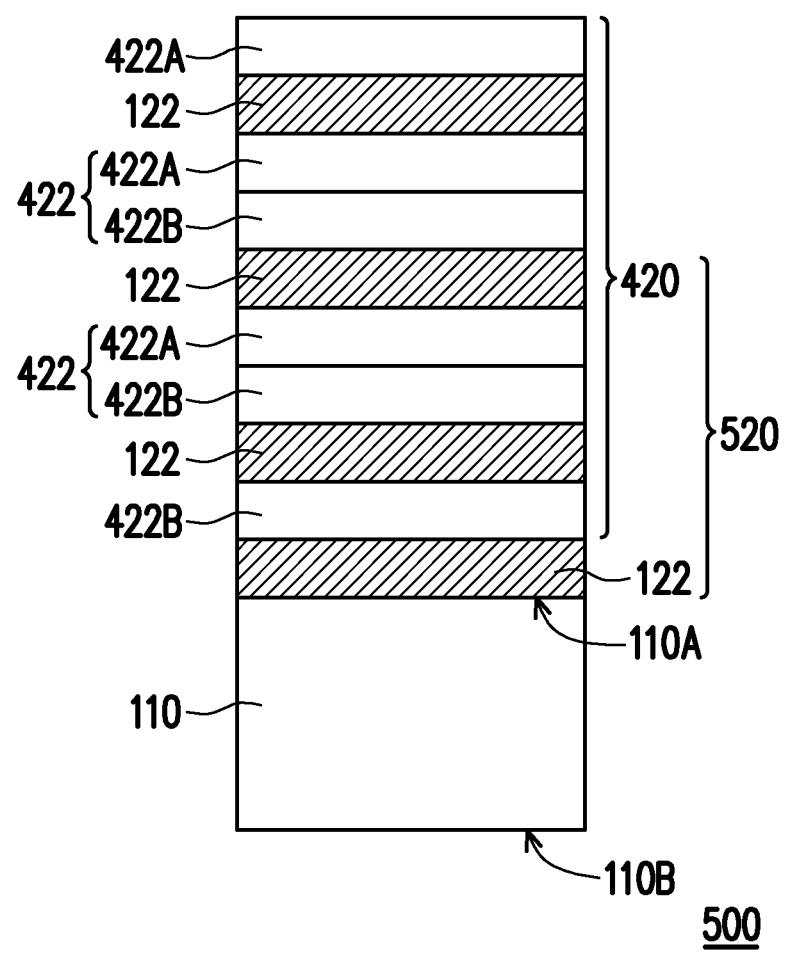
FIG. 5 is a schematic diagram of an electronic device according to an embodiment of the disclosure.

FIG. 5 is a schematic diagram of an electronic device according to an embodiment of the disclosure. An electronic device 500 of FIG. 5 includes the panel 110 and the polarizing element 520. The electronic device 500 is similar to the electronic device 400, so the same elements in the two embodiments may be cross-referred to and they are not repeated. The difference between the electronic device 500 and the electronic device 400 is that the polarizing element 520 includes the polarizing element 420 and further includes the coating polarizing layer 122 directly contacting the panel 110. For the method for manufacturing the coating polarizing layer 122 contacting the panel 110, the description of the embodiment of FIG. 1 may be referred to and it is not repeated.

Figure 6:
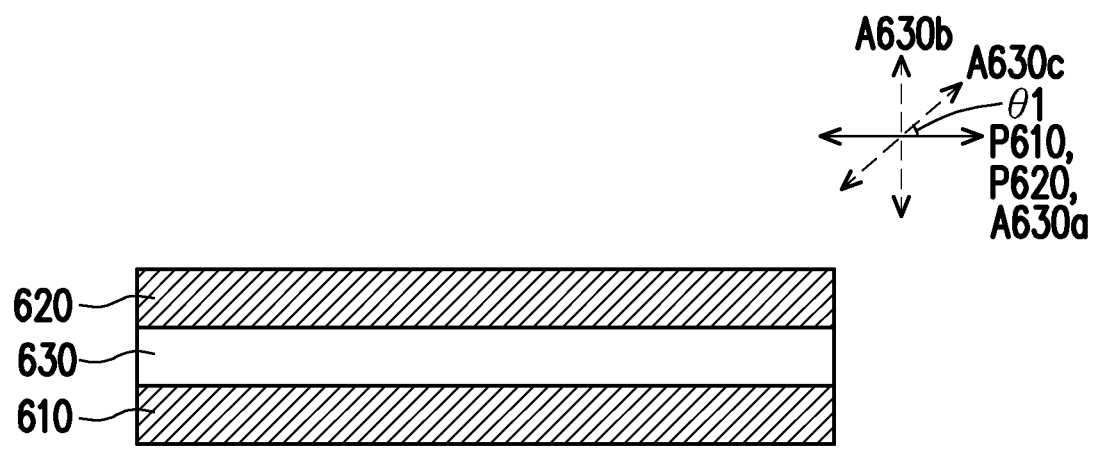
FIG. 6 and FIG. 7 are schematic diagrams illustrating an optical effect of a polarizing element in embodiments of the disclosure.
Figure 7:
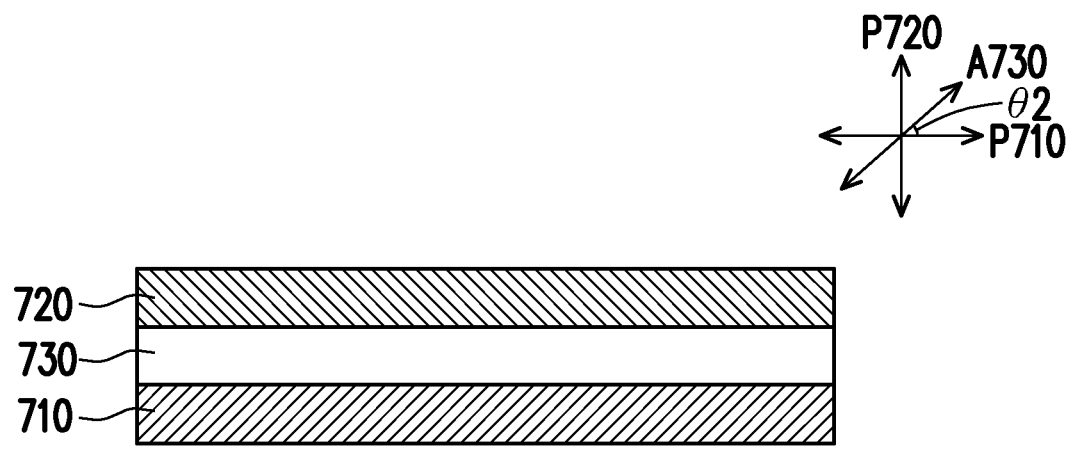

FIG. 6 and FIG. 7 are schematic diagrams illustrating an optical effect of a polarizing element in an embodiment of the disclosure. FIG. 6 illustrates a coating polarizing layer 610 and a coating polarizing layer 620 adjacent to each other in a polarizing element and an isolation layer 630 between the two adjacent ones of the coating polarizing layers 610 and 620. For a structure, material, and arrangement of the coating polarizing layer 610 and the coating polarizing layer 620, the description of the coating polarizing layer 122 in the embodiments above may be referred to, and for a structure, material, and arrangement of the isolation layer 630, the description of the isolation layer 222, the isolation layer 322, and the isolation layer 422 in the embodiments above may be referred to. In FIG. 6, a polarization direction P610 provided by the coating polarizing layer 610 and a polarization direction P620 provided by the coating polarizing layer 620 may be parallel to each other. In some embodiments, the isolation layer 630 may not exhibit the polarizing property, and the isolation layer 630 may not have phase retardation. For example, a phase retardation value of the isolation layer 630 may be equal to 0 (or with an error, such as 0±20 nm), and the optical absorption axes of two coating polarizing layers (e.g. the coating polarizing layer 610 and the coating polarizing layer 620) may be approximately parallel to each other. With the design above, the light passing the coating polarizing layer 610 may have a polarization state parallel to the polarization direction P610. After a polarized light passes the isolation layer 630 (without phase retardation), the polarized light still has the polarization state parallel to the polarization direction P610 and enters the coating polarizing layer 620. Since the polarization direction P620 of the coating polarizing layer 620 is approximately parallel to the polarization direction P610, the polarized light may mostly pass through the coating polarizing layer 620.

In some embodiments, the isolation layer 630 may have phase retardation, and the phase retardation value of the isolation layer 630 is not equal to 0 nm. The optical absorption axes of two coating polarizing layers 610 of the coating polarizing layers 610 may be parallel to each other or intersect each other.

For example, the polarization direction P610 provided by the coating polarizing layer 610 and the polarization direction P620 provided by the coating polarizing layer 620 may be approximately parallel. In addition, the isolation layer 630 may have phase retardation (i.e. the phase retardation value of the isolation layer 630 is not equal to 0). Furthermore, a slow axis A630a of the isolation layer 630 may be disposed approximately parallel to the polarization direction P610 of the coating polarizing layer. In this way, the light passing the coating polarizing layer 610 may still have the polarization state approximately parallel to the polarization direction P610 after passing the isolation layer 630. After the polarized light passes the isolation layer 630, the polarized light may mostly pass through the coating polarizing layer 620.

In some embodiments, the polarization direction P610 provided by the coating polarizing layer 610 and the polarization direction P620 provided by the coating polarizing layer 620 may be approximately parallel. At the same time, the isolation layer 630 may have phase retardation, and the phase retardation value of the isolation layer 630 is not equal to 0 nm. Furthermore, a slow axis A630b of the isolation layer 630 may be disposed approximately perpendicular to the polarization direction P610. In this way, the light passing the coating polarizing layer 610 may still have the polarization state approximately parallel to the polarization direction P610 after passing the isolation layer 630. After the polarized light passes the isolation layer 630, the polarized light may mostly pass through the coating polarizing layer 620.

In some embodiments, the isolation layer 630 may have phase retardation, and the phase retardation value of the isolation layer 630 is an integer multiple of a wavelength (e.g. $\lambda$) of an incident light (e.g. $n\lambda$, and n is an integer). A slow axis A630c of the isolation layer 630 may intersect the polarization direction P610 with an included angle $\theta 1$, and the included angle $\theta 1$ may be 45 degrees. In this way, the light passing the coating polarizing layer 610 may have the polarization state approximately parallel to the polarization direction P610 after passing the isolation layer 630. The polarized light passing the isolation layer 630 may mostly pass through the coating polarizing layer 620.

FIG. 7 illustrates a coating polarizing layer 710 and a coating polarizing layer 720 adjacent to each other in a polarizing element and an isolation layer 730 between the two adjacent ones of the coating polarizing layers 710 and 720. As shown in FIG. 7, a polarization direction P710 provided by the coating polarizing layer 710 and a polarization direction P720 provided by the coating polarizing layer 720 may intersect each other. The isolation layer 730 may have phase retardation. That is, a phase retardation value of the isolation layer 730 is not equal to 0. For example, the polarization direction P710 and the polarization direction P720 may be perpendicular to each other, and the phase retardation value of the isolation layer 730 is a half of the wavelength (e.g. $\lambda$) of the incident light (e.g. $\frac{1}{2}\lambda$). A slow axis A730 of the isolation layer 730 may intersect the polarization direction P710 with an included angle $\theta 2$, and the included angle $\theta 2$ is approximately 45 degrees. In this way, the light passing the coating polarizing layer 710 with a polarization direction P730 may be converted into a polarization state approximately parallel to the polarization direction P720 after passing the isolation layer 730. A polarized light may mostly pass through the coating polarizing layer 720. In summary, when the isolation layer 630 or isolation layer 730 has an optical direction, the light passing the coating polarizing layer 610 (or the coating polarizing layer 710) may be mostly adjusted to mostly pass through the coating polarizing layer 620 (or the coating polarizing layer 720) after passing the isolation layer 630 (or 730) by adjusting the orientation of the optical direction of the isolation layer (isolation layer 630 or isolation layer 730) and the two adjacent ones of the coating polarizing layers, such as the polarization directions of the coating polarizing layer 610 (or the coating polarizing layer 710) and the coating polarizing layer 620 (or the coating polarizing layer 720). Hence, the chances of blocking the light may be reduced.

Figure 8:
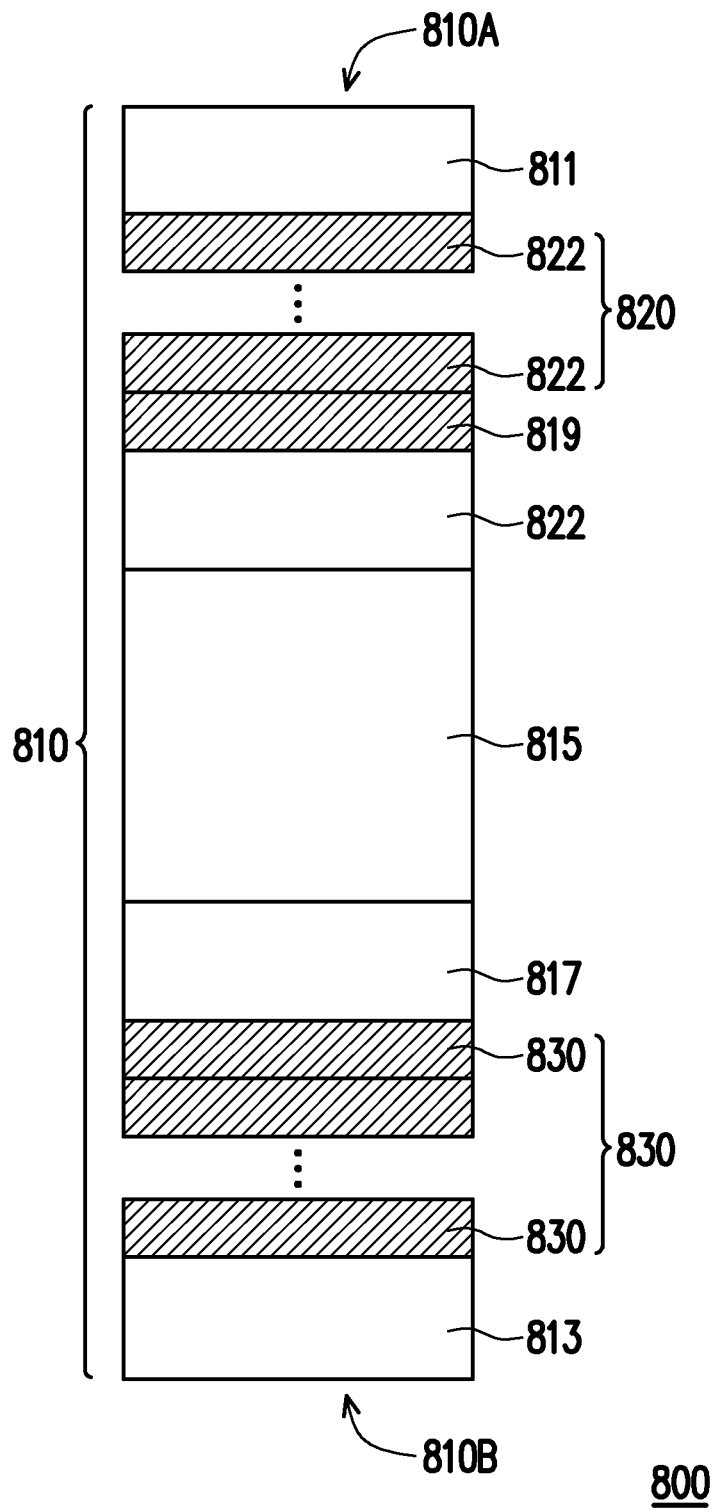
FIG. 8 is a schematic diagram of an electronic device according to an embodiment of the disclosure.

FIG. 8 is a schematic diagram of an electronic device according to an embodiment of the disclosure. An electronic device 800 of FIG. 8 includes a panel 810, a polarizing element 820, and a polarizing element 830. The polarizing element 820 is disposed at a first side 810A of the panel 810, and the polarizing element 830 is disposed at a second side 810B of the panel 810. The first side 810A and the second side 810B are opposite to each other. Specifically, the panel 810 includes a first substrate 811, a second substrate 813, a display medium 815, a driving structure layer 817, and a color filter layer 819. The display medium 815 is disposed between the first substrate 811 and the second substrate 813. The display medium 815 includes a light adjusting or light emitting display material. For example, the light adjusting display material includes liquid crystal, electrophoresis, an electro-wetting material or other suitable materials. The light emitting display material includes an organic light emitting material, a quantum dot material, or other suitable materials. In some embodiments (not shown), the polarizing element 820 or the polarizing element 830 may be alternatively removed from the electronic device 800. In some embodiments, the driving structure layer 817 is disposed between the second substrate 813 and the display medium 815. The color filter layer 819 is disposed between the first substrate 811 and the display medium 815. In some embodiments, the driving structure layer 817 may include an active element array or a passive element. In some embodiments, the polarizing element 820 is disposed between the first substrate 811 and the color filter layer 819. In some embodiments, the polarizing element 830 may be disposed between the second substrate 813 and the driving structure layer 817.

In some embodiments, the polarizing element 820 may include a plurality of coating polarizing layers 822, or the polarizing element 830 may include a plurality of coating polarizing layers 832. For a material, optical properties, and a method for manufacturing the coating polarizing layer 822 and the coating polarizing layer 832, the description of the coating polarizing layer 122 of FIG. 1 may be referred to. In the embodiment, a method for manufacturing the electronic device 800 includes the following. First, the plurality of coating polarizing layers 822 are formed on the first substrate 811 through coating to complete the polarizing element 820, and the color filter layer 819 is manufactured on the polarizing element 820. In addition, the plurality of coating polarizing layers 832 are formed on the second substrate 813 through coating to complete the polarizing element 830, and the driving structure layer 817 is manufactured on the polarizing element 830. Next, the first substrate 811 and the second substrate 813 are assembled opposite to each other. The display medium 815 is disposed between the first substrate 811 and the second substrate 813 so that the polarizing element 820 and the polarizing element 830 may be embedded in the panel 810 to form the electronic device 800; however, the disclosure is not limited thereto. In this way, the polarizing element 820 and the polarizing element 830 may be disposed inside the panel 810 and are located at the two opposite sides of the panel 810, that is, the first side 810A and the second side 810B.

Figure 9:
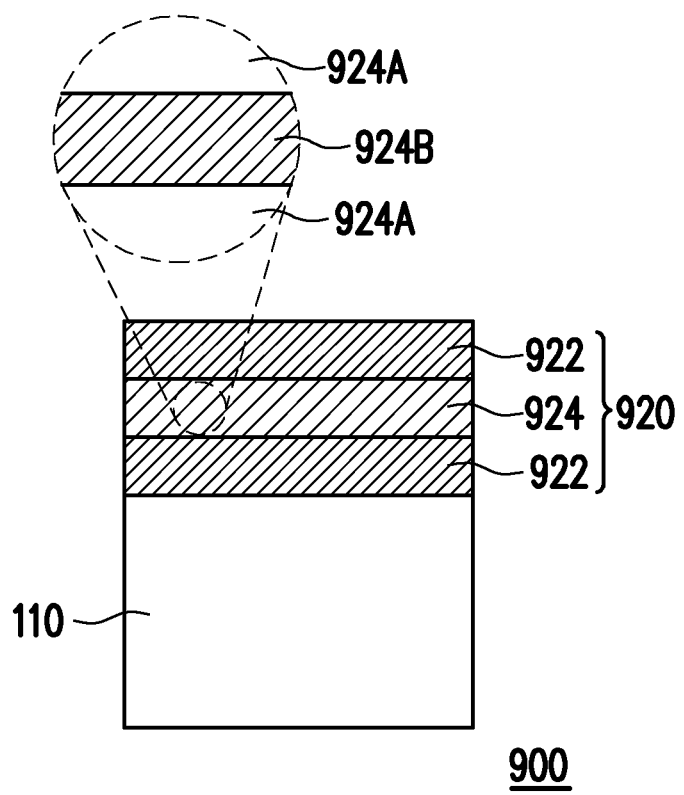
FIG. 9 is a schematic diagram of an electronic device according to an embodiment of the disclosure.

FIG. 9 is a schematic diagram of an electronic device according to an embodiment of the disclosure. An electronic device 900 of FIG. 9 includes the panel 110 and a polarizing element 920. The polarizing element 920 is disposed at one side of the panel 910, and the polarizing element 920 includes plurality of coating polarizing layers 922 and a stretch type polarizing layer 924; however, the disclosure is not limited thereto. For the specific features of the panel 110, the description of the embodiments above may be referred to. The plurality of coating polarizing layers 922 may be manufactured by adopting the method for manufacturing the coating polarizing layers 122 of FIG. 1. The stretch type polarizing layer 924 may be a film layer manufactured in advance and is attached to the panel 110 through an attachment method.

The stretch type polarizing layer 924 may include a medium layer 924B sandwiched between two supporting films 924A. The medium layer 924B includes, for example, a polymer material and/or dye distributed in the polymer material; however, the disclosure is not limited thereto. The medium layer 924B is formed by stretching the polymer material to cause the dye in the polymer material to be arranged corresponding to a stretching direction, and the two supporting films 924A are configured to sandwich the medium layer 924B to stabilize a state of the medium layer 924B. In some embodiment, the dye in the medium layer 924B may include iodine; however, the disclosure is not limited thereto. Specifically, a method for manufacturing the electronic device 900 includes the following. The first coating polarizing layer 922 is formed on the panel 110 through coating. The manufactured stretch type polarizing layer 924 may be attached to the first coating polarizing layer 922. The second coating polarizing layer 922 is formed on the stretch type polarizing layer 924 through coating. In this way, the polarization of the polarizing element 920 may be jointly provided by the plurality of coating polarizing layers 922 and the stretch type polarizing layer 924; however, the disclosure is not limited thereto. In other embodiments, the order of the coating polarizing layer and the stretch type polarizing layer may be adjusted according to requirements. In some embodiments, the plurality of coating polarizing layers 922 and the stretch type polarizing layer 924 may directly contact each other. In some embodiments, a polarization direction of the plurality of coating polarizing layers 922 and a polarization direction of the stretch type polarizing layer 924 may be parallel to each other.

Figure 10:
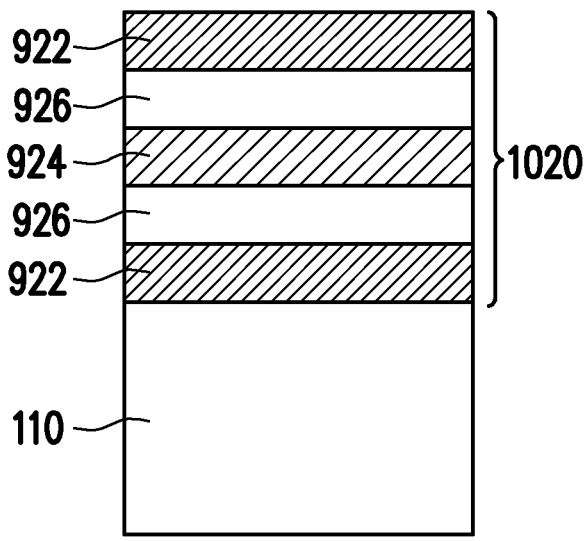
FIG. 10 is a schematic diagram of an electronic device according to an embodiment of the disclosure.

FIG. 10 is a schematic diagram of an electronic device according to an embodiment of the disclosure. An electronic device 1000 of FIG. 10 includes the panel 110 and a polarizing element 1020. The electronic device 1000 includes mostly the elements of the electronic 900 and further includes a plurality of isolation layers 926. Each of the plurality of isolation layers 926 is disposed between one of the coating polarizing layers 922 and the stretch type polarizing layer 924. The implementations of the isolation layers 926 may be similar to the implementations of the isolation layer 222 of FIG. 2, the isolation layer 322 of FIG. 3, or the isolation layer 422 of FIG. 4. In the embodiment, the polarization direction of the plurality of coating polarizing layers 922 and the polarization direction of the stretch type polarizing layer 924 may be adjusted according to the optical properties of the isolation layers 926, and for the specific adjustment method, the description of FIG. 6 and FIG. 7 may be referred to.

In summary of the above, the electronic device of the embodiments of the disclosure achieves the required polarization by adopting the plurality of coating polarizing layers. In some embodiments, the plurality of coating polarizing layers are formed on the panel through coating to enhance manufacturing flexibility. In addition, in some embodiments, the coating polarizing layers directly contact the panel to reduce a thickness of the electronic device.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. An electronic device, comprising:
   a panel; and
   a polarizing element disposed at a side of the panel, wherein the polarizing element comprises a plurality of coating polarizing layers and at least one isolation layer,
   wherein the at least one isolation layer is disposed between adjacent ones of the plurality of coating polarizing layers,
   wherein the at least one isolation layer does not exhibit a polarizing property,
   wherein a phase retardation value of the at least one isolation layer is a half of the wavelength of an incident light, and a polarization direction of the adjacent ones of coating polarizing layers of the plurality of coating polarizing layers are substantially perpendicular to each other.

2. The electronic device according to claim 1, wherein one of the plurality of coating polarizing layers contacts the panel.

3. The electronic device according to claim 1, wherein the at least one isolation layer comprises a plurality of isolation sub-layers.

4. The electronic device according to claim 1, wherein the polarizing element is disposed inside the panel.

5. The electronic device according to claim 1, further comprising:
   another polarizing element disposed at another side of the panel.

6. The electronic device according to claim 1, wherein one of the plurality of coating polarizing layers comprises a liquid crystal material, or a liquid crystal material mixed dye.

7. The electronic device according to claim 1, wherein a slow axis of the at least one isolation layer intersects the polarization direction of one of the adjacent ones of coating polarizing layers with an included angle θ2, and the included angle θ2 is 45 degrees.

* * * * *